(12) United States Patent
Woodard et al.

(10) Patent No.: US 8,375,045 B2
(45) Date of Patent: Feb. 12, 2013

(54) TRANSLATING A BINARY DATA STREAM USING BINARY MARKUP LANGUAGE (BML) SCHEMA

(75) Inventors: Matthew G. Woodard, Groton, MA (US); Matthew L. Shaw, Marlborough, MA (US)

(73) Assignee: Raytheon Company, Waltham, MA (US)

( * ) Notice: Subject to any disclaimer, the term of this patent is extended or adjusted under 35 U.S.C. 154(b) by 234 days.

(21) Appl. No.: 12/821,434

(22) Filed: Jun. 23, 2010

(65) Prior Publication Data
US 2011/0320501 A1     Dec. 29, 2011

(51) Int. Cl.
*G06F 7/00*     (2006.01)
(52) U.S. Cl. ........................................ 707/760
(58) Field of Classification Search .................. 707/760
See application file for complete search history.

(56) References Cited

U.S. PATENT DOCUMENTS
2002/0161907 A1 * 10/2002 Moon ........................... 709/230
2005/0031031 A1 * 2/2005 Osorio ...................... 375/240.01

OTHER PUBLICATIONS

"Markup Language", description from Wikipedia at http://en.wikipedia.org/wiki/Markup_language, dated Oct. 21, 2010, 7 pages.
"Extensible Markup Language (XML)", W3C, Ubiquitous Web Domain, XML Activity Statement, at http://www.w3.org/XML/, dated Oct. 21, 2010, 5 pages.

* cited by examiner

*Primary Examiner* — Truong Vo
(74) *Attorney, Agent, or Firm* — Daly, Crawford, Mofford & Durkee, LLP

(57) ABSTRACT

In one aspect, a method includes defining a schema using binary markup language (BML) and storing the schema on a non-transitory machine readable medium and translating a binary data stream using the schema. In another aspect, an article includes a non-transitory machine-readable medium that stores executable instructions. The instructions cause a machine to define a schema using the BML, store the schema on a non-transitory machine readable medium and translate a binary data stream using the schema. In a further aspect, an apparatus includes circuitry to define a schema using the BML, store the schema on a non-transitory machine readable medium and translate a binary data stream using the schema.

13 Claims, 6 Drawing Sheets

TRANSLATING A BINARY DATA STREAM USING BINARY MARKUP LANGUAGE (BML) SCHEMA

BACKGROUND

Extensible Markup Language (XML) is a markup language similar to HyperText Markup Language (HTML). XML was developed to move and store data rather than display the data as in HTML. In general, XML is a self-descriptive language.

SUMMARY

In one aspect, a method includes defining a schema using binary markup language (BML) and storing the schema on a non-transitory machine readable medium and translating a binary data stream using the schema. In another aspect, an article includes a non-transitory machine-readable medium that stores executable instructions. The instructions cause a machine to define a schema using the BML, store the schema on a non-transitory machine readable medium and translate a binary data stream using the schema. In a further aspect, an apparatus includes circuitry to define a schema using the BML, store the schema on a non-transitory machine readable medium and translate a binary data stream using the schema.

DETAILED DESCRIPTION

Existing systems communicate with binary networks by building components capable of receiving and processing the binary protocols needed at the time of construction. One of the pitfalls of this approach is that there is little reuse of the work, especially between systems built with different technologies (e.g., Ada versus Java versus C). Also, user components are often subsets of the complete protocol and integrating the user components with a new protocol is often a nontrivial task. As of yet there has not been a solution to translate binary data streams generically.

Described herein is a Binary Markup Language (BML) that enables binary data to be generated and processed generically. Though many next generation architectures choose XML as a messaging language due to the ease of parsing and validation, message size is of concern in bandwidth limited environments such as network centric architectures. BML mimics the flexibility and interoperability of XML without sacrificing the performance advantages of binary message formats.

Figure 1:
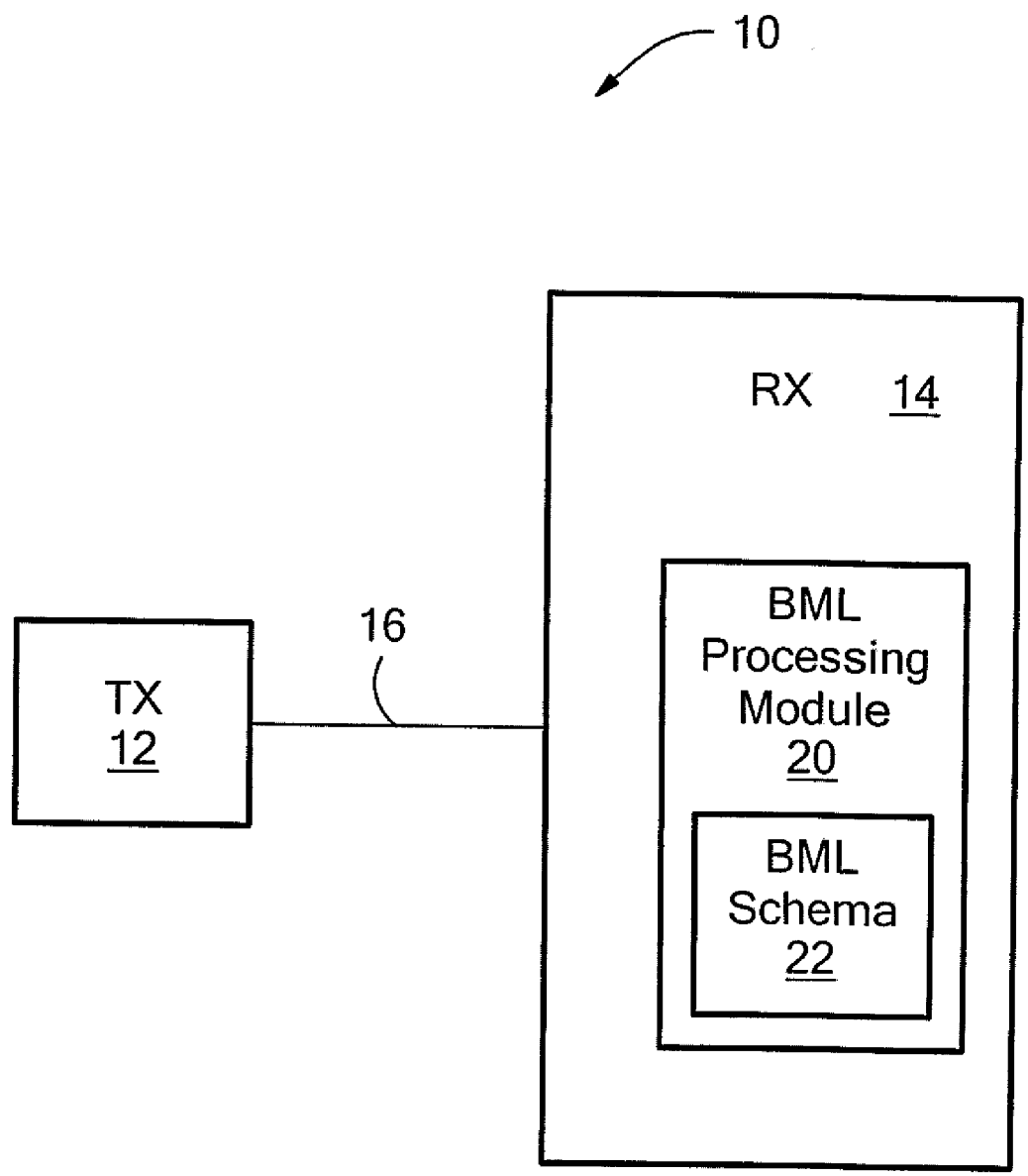
FIG. 1 is a block diagram of an example of an architecture using binary markup language (BML).

Referring to FIG. 1, a data processing system includes a transmitter 16 that transmits a binary data stream to a receiver 14 over a channel 15. The receiver 14 includes a BML processing module 20 that translates the binary data stream using a BML schema 22. In some examples, the transmitter 12 also includes a BML processor module used to generate the binary data stream.

Figure 2:
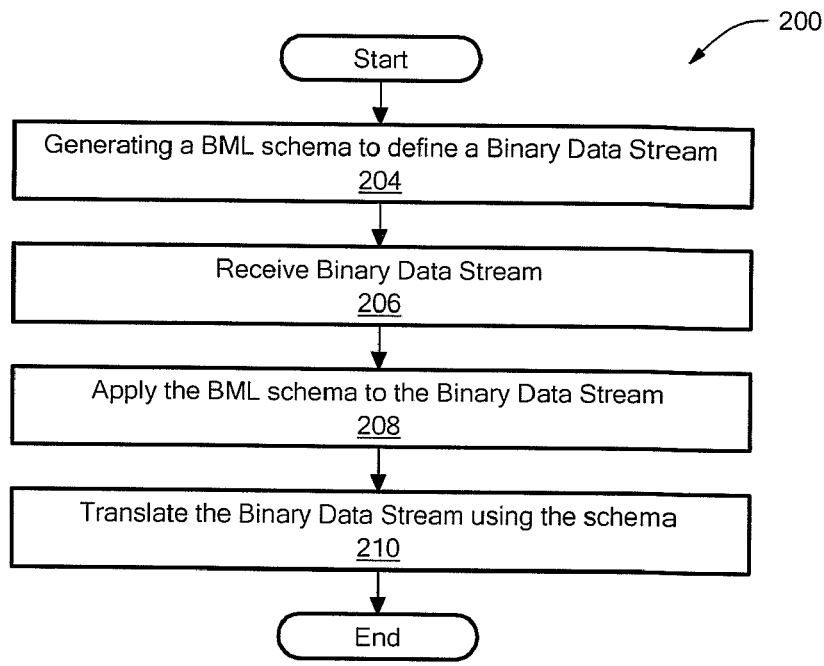
FIG. 2 is a flowchart of an example of a process to process a binary data stream.

Referring to FIG. 2, an example of a process to translate the binary data stream is a process 200. A BML schema (e.g., the BML schema 22) is generated to define the binary data stream (204). The binary data stream is received (206), the BML schema is applied to the binary data stream (208) and the binary data stream is translated using the BML schema (210).

Figure 3:
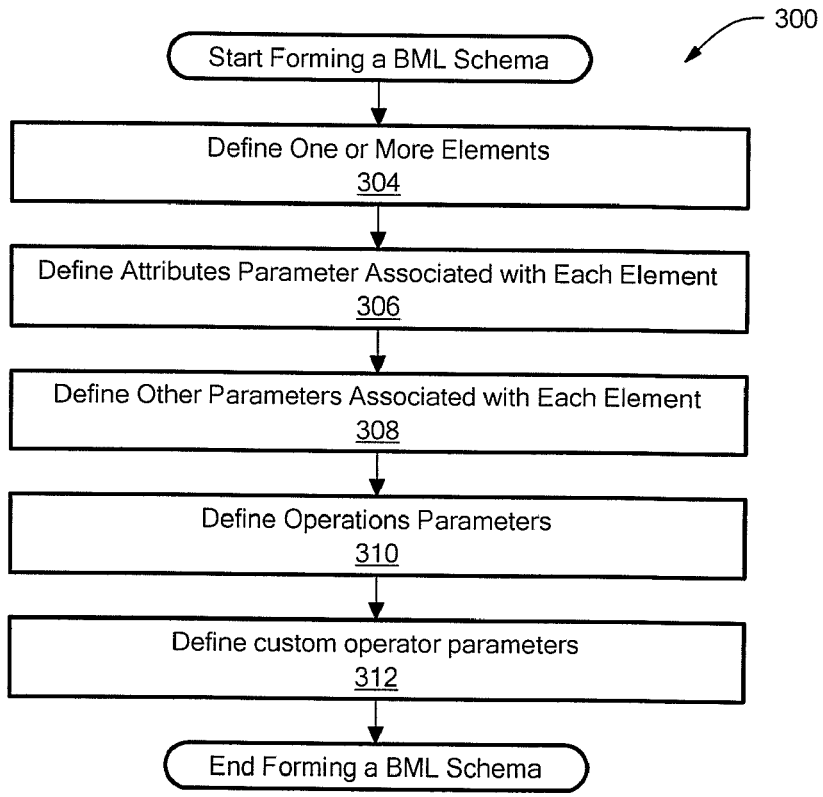
FIG. 3 is a flowchart of an example of a process to form a BML schema.

Referring to FIG. 3, an example of a process to form a BML schema (e.g., the BML schema 22) is a process 300. In one example, the BML schema is a restricted form of XML describing the content of a binary data stream.

One or more elements are defined (304). The BML schema describes a single binary message, composed of units called elements, each of which represents a series of bits that can be parsed into a series of attributes. The BML schema provides a mechanism to impose order to the bits that form each element thereby adapting the processing of the binary data stream using the contents of the binary data stream in a generic fashion. In one example, the BML schema is an XML document conforming to a predefined XML schema.

An element represents a series of bits contained within the binary message. It is composed of an attributes parameter and any number of child elements, sequences, or choice parameters. In one example, the attributes parameter is processed first. In another example, children of an element are processed if and only if the element itself is processed.

Each element in the BML schema is uniquely identified, for example, by using an ID attribute to name the element. A value used with ID attribute can be used to refer to element instances at runtime. In one example, each element has a locally unique ID. If two elements have the same ID value, then an error is raised.

The length of an element is determined either by a length attribute defining the length, or by summing the bits of each attribute in the attributes parameter. If an element represents more bits than are represented by the attributes, the length is specified using an attribute. The length may or may not have to terminate on a byte boundary, depending on the underlying BML processor module performing the parsing. In one example, BML supports byte-boundary lengths. In one example, the length of each element is a factor of 8.

By default, an element is assumed to be big-endian. A reversed attribute may be used to set to true to force the underlying the BML processor module to treat the bytes making up the word as a little-endian value. In a big-endian system, multi-byte data types store the most significant value in the sequence at the lowest storage address. Little-endian systems place the least significant value first. The bit locations of each attribute in the attributes parameter refer to location of the bit in a big-endian number, regardless of the value of the reversed attribute.

An attributes parameter associated with each of the one or more elements is defined (306). An attributes parameter includes any number of attribute parameters and choice parameters.

Other parameters associated with the one or more element are defined (308). These other parameters may include any one or more of the attribute parameter, a choice parameter, an iteration parameter, a count parameter, a property parameter, and a default option parameter. Any choice parameters appearing within this context, whether directly within the attributes parameter or as a child of another choice parameter, contain only attribute or choice parameters. The length of an element in bytes is determined by adding the size of the children contained in the attributes element if the length attribute is not specified in the element.

The size of an element remains constant, and therefore the calculation of its size using attribute parameters are evaluated to the same value. Any choice parameter contained in an attributes parameter represents the same number of bits in a stream, regardless of the option chosen during processing by the BML processor module. Thus, each option contained within the choice element equates to the same number of bits, though the bits may be spread amongst different attribute parameters.

The attribute parameter describes one field of an element. Each attribute parameter has an assigned a length, which represents its size in bits. As a binary data stream is read, the contents are unpacked into attributes and stored in the element. In one example, the built-in types for BML are Boolean and integer. In one example, the default type for an attribute parameter is integer.

The iteration parameter represents a series of repeated parameters that are executed from 0 to many times. The iteration parameter includes a property, a coded value, or an operator parameter indicating how many times an iteration statement is executed. Following the threshold parameter, the iteration parameter may contain a child element, iteration, or choice parameters. The complete sequence of parameters is processed multiple times in the order in which they are specified.

The property parameter is used to specify a threshold based on an attribute of an element. The attribute specified is a value that was previously parsed. A hard coded value may be specified using the count parameter instead. Operator parameters such as subtraction, division, multiplication, or addition operators can be used to calculate more complex threshold values. In one example, an iteration parameter includes one and only one threshold parameter.

A count parameter is used within an iteration parameter to hard code the number of times an iteration parameter is executed. The value attribute of the count parameter is an integer instructing the BML engine to process the contents of the iteration a specific number of times.

A property parameter may be used to dynamically control the number of times an iteration parameter is executed, to locate the value with which an option is chosen while processing choice parameter, or as an operand to an operation parameter. If the parameter has no ID attribute, the immediate element parent of this parameter is used as a source for the attribute value. If an ID is specified, it refers to an element whose ID matches that of the property. If this approach is used, the element referred to by this ID precedes the iteration parameter in processing. If this is not the case, an error is raised.

A choice parameter contains one default option parameter and a list of option parameters. In one example, one and only one of these parameters are processed by comparing the value of each option parameters to a computed value. The computed value is either the value of an attribute of an element or a value of an operation parameter, such as subtraction, addition, division, and multiplication operators. A property parameter is also used to refer to an attribute of an element.

The default option parameter is processed if no option parameter is processed. A choice parameter contains one property or operation parameter defining the value used to choose an option.

When defined within an attributes parameter, a choice parameter may contain only attribute parameters or nested choice parameters. An attribute parameter used to compute the matching option parameter precedes the choice parameter in the list of attributes. As a binary data stream is parsed, the previously parsed value is used to determine which option parameter will be chosen when the choice parameter is processed.

When defined within an element, the choice parameter is executed using an attribute of the element in which it is found, or one of its parents. The element attributes are processed before any further processing may proceed whether a choice parameter is nested within another choice parameter or iteration parameter. In all cases, the attributes of the element pointed to by the property element is used to process the choice parameter.

The option parameter includes element, iteration, and choice parameters if the choice parameter is not defined within an attributes parameter. Otherwise, the option parameter may include only attribute or choice parameters.

The default option parameter is processed exactly like the contents of an option parameter. The difference lies only with the manner in which one or the other is selected while processing the choice parameter.

The operation parameters are defined for each element (310). Various operation parameters may be used to calculate the value used to execute a choice parameter or to calculate the number of times an iteration parameter is executed. The data contained in the binary specification may not contain an exact value for these operations. By default, standard arithmetic operations are supplied as part of this specification. However, the specification also includes a means with which custom operations can be added as needed.

The three basic types of operations are binary, unary, n-ary, and custom. Binary operations expect 2 operands. Unary operations expect one. N-ary operations expect from one to many. In every case, an operand may be replaced with an operation. This behavior is recursive, permitting arbitrarily complex arithmetic (e.g. (word count/5)−1).

Addition is a binary operation resulting in the following equation:

value=operand1+operand2

Division is a binary operation resulting in the following equation:

value=operand1/operand2

Log is a unary operation resulting in the following equation:

value=log(operand1)

Multiplication is a binary operation resulting in the following equation:

value=operand1*operand2

Subtraction is a binary operation resulting in the following equation:

value=operand1−operand2

Custom operation parameters are defined (312). Each custom operator parameter is registered with the BML processing module 20 prior to evaluating a binary data stream using the specification containing the call to the operator. The custom operator parameter is referred to using a function name, specified using the function attribute of the custom operator parameter. Unlike the operations parameter, a custom operator parameter may contain any number of operands and even no operands at all. Custom operator parameters are included in order to provide extensibility to BML.

Figure 4A:
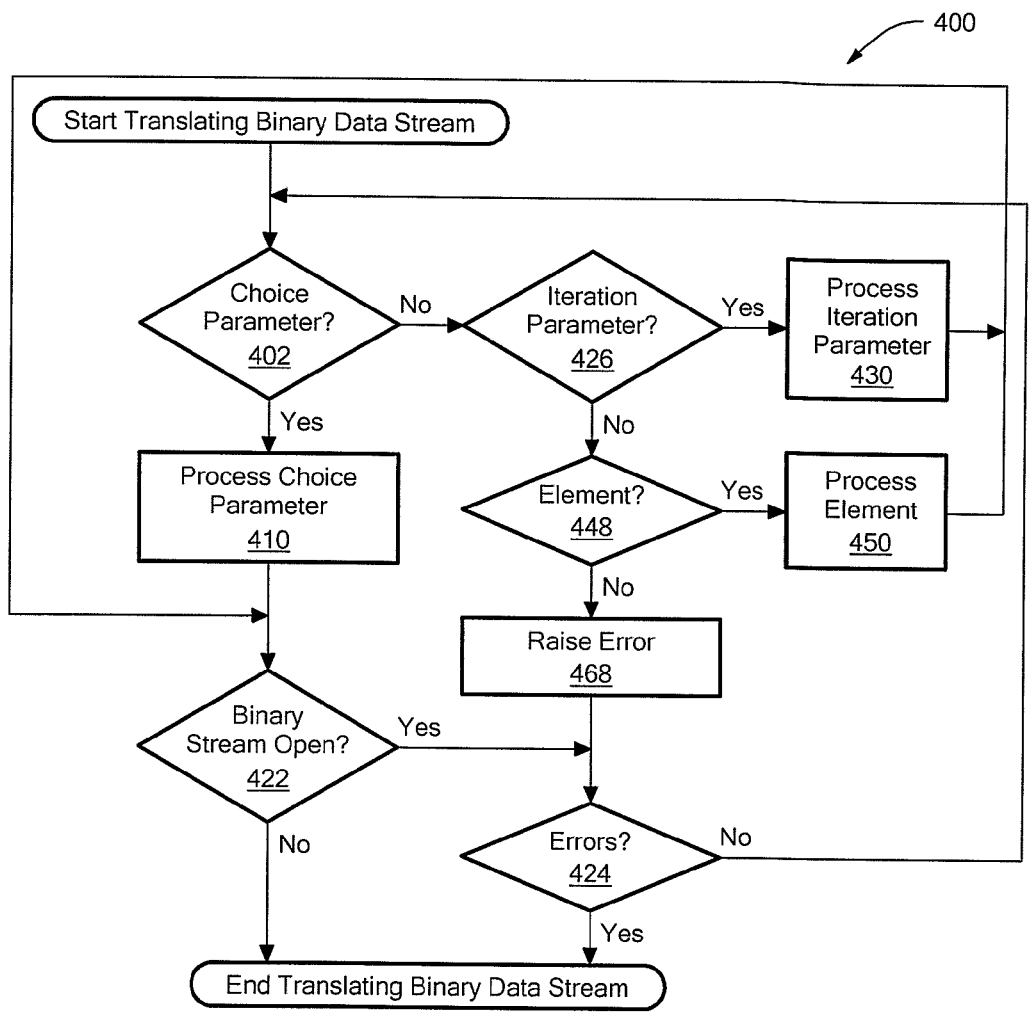
FIG. 4A to 4D are flowcharts of examples of processes used to translate the binary data stream.

Referring to FIG. 4A, an example of a process to translate a binary data stream using a BML schema is a process 400. Translating a binary data stream involves iteratively traversing a BML schema, which results in the processing of each element along with iteration parameters and choice parameters. When the end of the schema has been reached, a new entity has been generated (e.g., generated in volatile memory). The BML schema is repeatedly traversed for as long as the binary data stream is open and no error conditions have arisen.

Process 400 determines if a choice parameter has been detected (402). If choice parameter has been detected process 400 processes the choice parameter (410). If the choice parameter is not detected, process 400 determines if the iteration parameter has been detected (426). If the iteration parameter is detected, process 400 processes the iteration parameter (430). If the iteration parameter is not detected, the process 400 determines if the element is detected (448). If the element is detected, process 400 processes the element 450. If the element is not detected, process 400 raises an error flag (468).

After processing blocks 410, 430 and 450 are performed, process 400 determines if the binary data stream is open (422). If the binary data stream is open, process 400 determines if there are errors. If there are errors processing 400 ends. Otherwise, process 400 repeats.

Figure 4B:
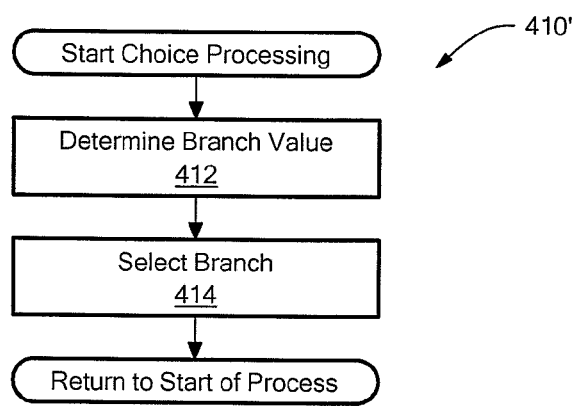

Referring to FIG. 4B, in one example, processing block 410 in FIG. 4A is performed using a process 410'. Processing 410' determines a branch value (412), selects a branch based on the branch value (414) and returns to the start of process 400. The branch value is compared with the value of each child option contained in the choice parameter. If no match exists, the default option parameter is chosen. Choice parameters may appear as both siblings to and children of other parameters. Branch values may be calculated using any previously processed attribute values; however, no information that has yet to be read from the binary data stream is used in this calculation.

Figure 4C:
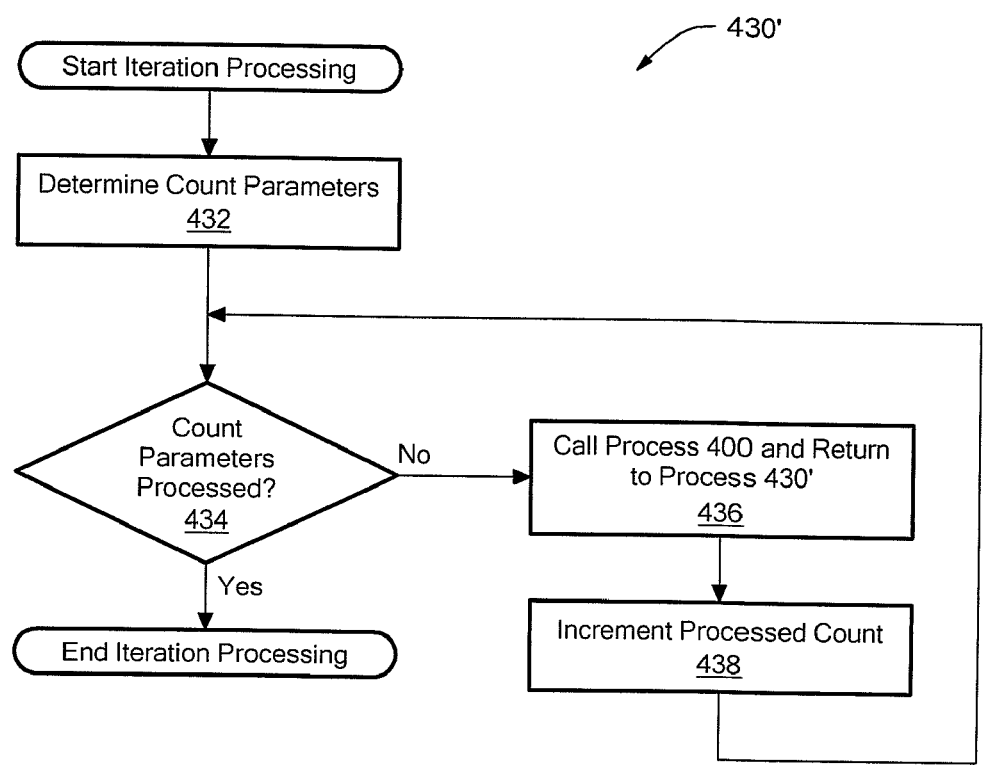

Referring to FIG. 4C, in one example, processing block 430 in FIG. 4A is performed using a process 430'. Process 430' determines count parameters (432). Count values can be any positive integer value or 0. A count value may be calculated using any previously processed attribute values; however, no information that is yet to be read from the binary data stream is used in this calculation.

In particular, process 430' determines if the count items have been processed (434). If there are count item are not processed, process 430' call the process 400 and returns to this point in the flow of process 430' (436) and increments the process count (438). The entire contents of the iteration parameter are processed by calling process 400 as many times as the count value indicates. This allows iterations to contain a nested element, choice, and iteration parameters.

Figure 4D:
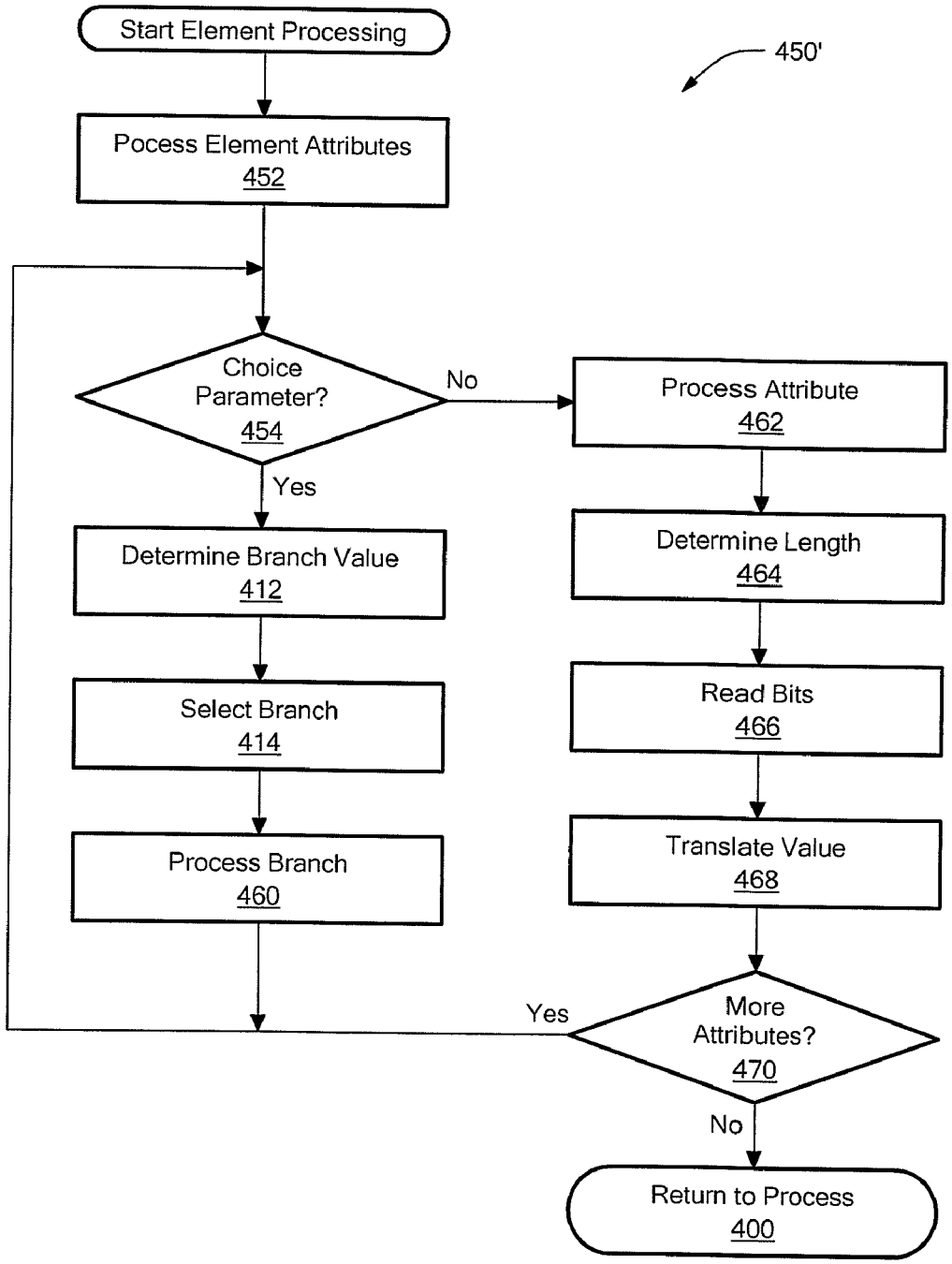

Referring to FIG. 4D, in one example, processing block 450 in FIG. 4A is performed using a process 450'. Process 450' processes an element. If an element is encountered, it contains any combination of attributes or choice parameters, with the caveat that at a total of least one attribute or choice parameter must exist. An object representing the stream entity is formed (e.g., stored in volatile memory). If a choice parameter is encountered, a branch value is calculated. The branch value is compared with the value of each child option contained in the choice element. If no match exists, the default option parameter is chosen. Choice parameters may appear as both siblings to and children of other parameters. Branch values may be calculated using any previously processed attribute values; however, no information that has yet to be read from the binary data stream is used in this calculation.

In particular, process 450' processes the element attributes (452). Process 450' determines if there are any choice parameters (454). If there are choice parameters, process 450' determines a branch value (412), selects a branch (414) and processes the branch (460). If an attribute parameter is encountered (462), the length of the attribute is determined (464), and that number of bits is read from the binary data stream (466). The bits are then converted into a value whose type is defined in the attribute parameter definition (468).

Process 450' determines if there are any more attributes (470). If there more attributes repeats processing block 454.

When no more choice or attribute parameters exist, process 450' ends by returning to process 400 and the translated value is associated with the entity (e.g., the entity constructed in volatile memory). In one example, contents of the binary data stream are placed in attributes, a length of each element is determined and the attributes are stored by element.

Figures 5, 6:
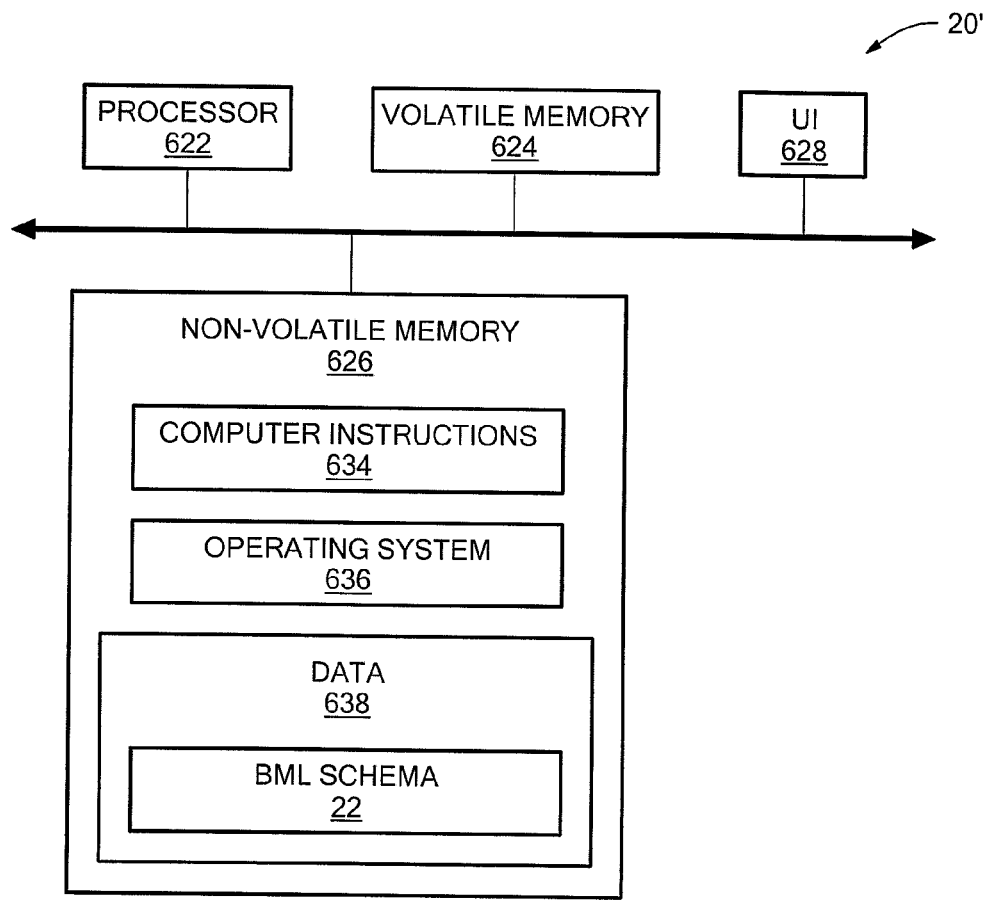
FIG. 5 is a diagram of an example of a byte distribution from the binary data stream using a BML schema.
FIG. 6 is a block diagram of an example of a computer for which the processes of FIGS. 2 to 4 may be implemented.

Referring to FIG. 5, the following is an example of a BML schema. The messages processed by this BML schema are fixed length and composed of a single element containing four attributes.

```
<?xml version="1.0" encoding="UTF-8"?>
<bml:binary_specification xmlns:bml="http://enic.raytheon.com/
binaryLanguage"
    xmlns:xsi="http://www.w3.org/2001/XMLSchema-instance"
    xsi:schemaLocation="http://enic.raytheon.com/binaryLanguage ../
    binaryLanguage.xsd ">
    <bml:element id="1" name="Element1">
        <bml:attributes>
            <bml:attribute name="data1" length="14"/>
            <bml:attribute name="data2" length="8"/>
            <bml:attribute name="flag1" length="1"    type="boolean" />
            <bml:attribute name="flag2" length="1"    type="boolean" />
        </bml:attributes>
    </bml:element>
</bml:binary_specification>
```

The BML schema indicates that the binary data stream includes fixed length messages composed of 24 bits, or 3 bytes. Each message contains one element with four attributes: data1, data2, flag1, and flag2. The first two attributes default to integers and the last two are Boolean values. The bytes are broken down as shown in FIG. 5.

Using the BML schema, the BML processor module can read full messages and parse the packed bits into meaningful values without needing to work with the binary data stream or the bits themselves. When working with binary data streams, the packing and unpacking of values into their bit representations is often the most arcane task. Using BML, a developer can avoid working with data on a low level and concentrate instead on providing a readable definition of the contents of the binary data stream. The result is both a simpler development cycle and a document clearly defining the binary specification for reference by machines and humans in future projects.

Referring to FIG. 6, an example of a BML processing module 20 to process a binary data stream is a BML processor module 20'. The BML processing module 20' includes a processor 622, a volatile memory 624, a non-volatile memory 626 (e.g., a hard disk) and a user interface (UI) 628 (e.g., a mouse, a touch screen, a keyboard, a display, for example). The non-volatile memory 626 stores computer instructions 634, an operating system 636 and data 638 including the BML schema 22. In one example, the computer instructions 434 are executed by the processor 622 out of volatile memory 624 to perform all or part of the processes described herein (e.g., the processes 200, 300, 400, 410', 430' and 450').

The processes described herein (e.g., the processes 200, 300, 400, 410', 430' and 450') are not limited to use with the hardware and software configuration shown in FIG. 6; they may find applicability in any computing or processing environment and with any type of machine or set of machines that are capable of running a computer program. The processes described herein may be implemented in hardware, software, or a combination of the two. The processes described herein may be implemented as a set or subset of services in computer programs executed on programmable computers/machines that each includes a processor, a storage medium or other article of manufacture that is readable by the processor (including volatile and non-volatile memory and/or storage elements), at least one input device, one or more output devices, and a network connection. Program code may be applied to data entered using an input device to perform the processes described herein and to generate output information.

The system may be implemented, at least in part, via a computer program product, (e.g., in a machine-readable storage device), for execution by, or to control the operation of, data processing apparatus (e.g., a programmable processor, a computer or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein (e.g., the processes 200, 300, 400, 410', 430' and 450'). The processes described herein may also be implemented as a machine-readable storage medium, configured with a computer program, where upon execution, instructions in the computer program cause the computer to operate in accordance with the processes.

The processes described herein are not limited to the specific embodiments described. For example, the processes 200, 300, 400, 410', 430' and 450' are not limited to the specific processing order of FIGS. 2, 3, 4A to 4D, respectively. Rather, any of the processing blocks of FIGS. 2, 3, 4A to 4D may be re-ordered, combined or removed, performed in parallel or in serial, as necessary, to achieve the results set forth above.

The processing blocks in FIGS. 2, 3, 4A to 4D associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)). Elements of different embodiments described herein may be combined to form other embodiments not specifically set forth above. Other embodiments not specifically described herein are also within the scope of the following claims.

What is claimed is:

1. A method, comprising:
defining a schema using binary markup language (BML), the schema comprising one or more elements representing a series of bits and each element comprising an attributes parameter, the attributes parameter comprising at least one of an attribute parameter describing one field of an element and a choice parameter including one default option and a list of option parameters, defining the schema comprising:
defining the one or more elements;
defining the attributes parameter for each element;
storing the schema on a non-transitory machine readable medium; and
translating a binary data stream using the schema,
wherein translating a binary data stream using the schema comprises:
determining if a choice parameter is detected;
processing the choice parameter if the choice parameter is detected;
determining if an iteration parameter is detected if a choice parameter is not detected;
processing the iteration parameter if the iteration parameter is detected;
determining if an element is detected if the iteration parameter is not detected;
processing the element if the element is detected; and
raising an error if the element is not detected,
wherein processing the choice parameter comprises determining a branch value and selecting a branch,
wherein processing the iteration parameter comprises determining count parameters and processing the count parameters determined,
wherein processing the element comprises:
determining if there are any choice parameters;
determining a branch value, selecting a branch and processing the branch if there are choice parameters;
determining if an attribute parameter is detected;
determining a length of the attribute, read a number of bits from the binary data stream and convert the number of bits into a value whose type is defined in an attribute parameter definition if the attribute parameter is detected.

2. The method of claim 1 wherein translating the binary data stream comprises moving contents of the binary data stream into packets.

3. The method of claim 1 wherein translating the binary data stream further comprises determining the length of an element from one of a length attribute or by summing bits of each attribute associated with the element.

4. The method of claim 1 wherein translating the binary data stream further comprises storing attribute values by element.

5. An article comprising:
a non-transitory machine-readable medium that stores executable instructions, the instructions causing a machine to:
store a schema on a non-transitory machine readable medium), the schema comprising one or more elements representing a series of bits and each element comprising an attributes parameter, the attributes parameter comprising at least one of an attribute parameter describing one field of an element and a choice parameter including one default option and a list of option parameters; and
translate a binary data stream using the schema,
wherein the instructions causing the machine to translate the binary data stream further comprises instructions causing the machine to:
determine if a choice parameter is detected;
process the choice parameter if the choice parameter is detected;

determine if an iteration parameter is detected if a choice parameter is not detected;

process the iteration parameter if the iteration parameter is detected;

determine if an element is detected if the iteration parameter is not detected;

process the element if the element is detected; and raise an error if the element is not detected, wherein the instructions causing the machine to process the choice parameter comprises instructions causing the machine to determine a branch value and selecting a branch, wherein the instructions causing the machine to process the iteration parameter comprises instructions causing the machine to determine count parameters and process the count parameters determined, wherein the instructions causing the machine to process the element comprises instructions causing the machine to:

determine if there are any choice parameters;

determine a branch value, select a branch and process the branch if there are choice parameters;

determine if an attribute parameter is detected;

determine a length of the attribute, read a number of bits from the binary data stream and convert the number of bits into a value whose type is defined in an attribute parameter definition if the attribute parameter is detected.

6. The article of claim 5 wherein the instructions causing the machine to translate the binary data stream comprises instructions causing the machine to move contents of the binary data stream into packets.

7. The article of claim 5 wherein the instructions causing the machine to translating the binary data stream comprises instructions causing the machine to determine the length of an element from one of a length attribute or by summing bits of each attribute associated with the element.

8. The article of claim 5 wherein the instructions causing the machine to translate the binary data stream further comprises instructions causing the machine to store attribute values by element.

9. An apparatus, comprising:

circuitry to:

store a schema using binary markup language (BML), the schema comprising one or more elements representing a series of bits and each element comprising an attributes parameter, the attributes parameter comprising at least one of an attribute parameter describing one field of an element and a choice parameter including one default option and a list of option parameters; and translate a binary data stream using the schema, wherein the circuitry to translating the binary data stream comprises circuitry to:

determine if the choice parameter is detected;

process the choice parameter if the choice parameter is detected;

determine if an iteration parameter is detected if a choice parameter is not detected;

process the iteration parameter if the iteration parameter is detected;

determine if an element is detected if the iteration parameter is not detected;

process the element if the element is detected; and raise an error if the element is not detected, wherein the circuitry to process the choice parameter comprises circuitry to determine a branch value and selecting a branch, wherein the circuitry to process the iteration parameter comprises circuitry to determine count parameters and process the count parameters determined, wherein the circuitry to process the element comprises circuitry to:

determine if there are any choice parameters;

determine a branch value, select a branch and process the branch if there are choice parameters;

determine if an attribute parameter is detected;

determine a length of the attribute, read a number of bits from the binary data stream and convert the number of bits into a value whose type is defined in an attribute parameter definition if the attribute parameter is detected.

10. The apparatus of claim 9 wherein the circuitry comprises at least one of a processor, a memory, programmable logic and logic gates.

11. The apparatus of claim 9 wherein the circuitry to translate the binary data stream comprises circuitry to move contents of the binary data stream into packets.

12. The apparatus of claim 9 wherein the circuitry to translating the binary data stream comprises circuitry to determine the length of an element from one of a length attribute or by summing bits of each attribute associated with the element.

13. The apparatus of claim 9 wherein the circuitry to translate the binary data stream further comprises circuitry to store attribute values by element.

* * * * *